United States Patent Office 2,903,471
Patented Sept. 8, 1959

2,903,471
METHOD FOR PREPARING A COMPLEX OF AN ALUMINUM ALCOHOLATE WITH ALUMINUM AND BORON HYDRIDES

Janos Kollonitsch, Westfield, N.J., assignor to Metal Hydrides Incorporated, Beverly, Mass., a corporation of Massachusetts No Drawing. Application January 13, 1958
Serial No. 708,403

5 Claims. (Cl. 260—448)

This invention relates to the preparation of complexes of any aluminum alcoholate with aluminum and boron hydrides having the formula

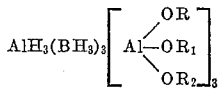

in which R, $R_1$ and $R_2$ are monovalent radicals selected from the group consisting of alkyl, cycloalkyl, alkenyl, aralkyl or an alkyl radical substituted with a halogen and in which R, $R_1$ and $R_2$ may be the same or different radicals.

These complexes are useful as reducing agents for reducing various organic and inorganic compounds, such as for reducing aldehydes to carbinols, nitriles to amines and carboxylic acid esters to primary carbinols. Some of these complexes are crystalline or glassy solids and others are liquids with a tendency to supercooling. They are stable compounds and are soluble in a variety of solvents, such as diethyl ether, benzene, hexane, chloroform, carbon tetrachloride and tetrahydrofuran, the solubility varying with the specific complex and specific solvent. The thermal stability of these compounds varies, some being distillable while others decompose before reaching the distillation temperature.

One method for preparing these compounds is described in my co-pending application Serial No. 683,953, filed September 16, 1957. In accordance with this method aluminum hydride is reacted with an ester of boric acid in a liquid carrier at a temperature below the temperature at which aluminum hydride decomposes, the preferred temperature being between 0° C. and normal room temperature. The reaction is illustrated by the reaction of aluminum hydride with methyl borate as shown by the equation:

$$4AlH_3 + 3B(OCH_3)_3 \rightarrow AlH_3(BH_3)_3[Al(OCH_3)_3]_3$$

One or more moles of methyl borate in the above equation may be replaced by the boric acid ester of a different alcohol.

The present invention provides another method for preparing the above mentioned complexes. In accordance with the method of the present invention aluminum borohydride in the form of an etherate is reacted with an aluminum alcoholate in a liquid carrier at a temperature below the temperature at which the aluminum borohydride etherate decomposes, the preferred temperature being between 0° C. and normal room temperature. The aluminum alcoholate may be selected from those having the formulas $Al(OR)_3$, $Al(OR_1)_3$, $Al(OR_2)_3$,

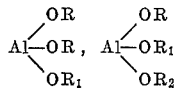

and mixtures thereof, where R, $R_1$ and $R_2$ are monovalent radicals selected from the group consisting of alkyl, cycloalkyl, alkylene, aralkyl, or an alkyl radical substituted with a halogen and in which R, $R_1$ and $R_2$ may be the same or different radicals. The reaction is illustrated by the reaction of aluminum borohydride with aluminum methylate as shown by the equation:

$$Al(BH_4)_3 + 3Al(OCH_3)_3 \rightarrow AlH_3(BH_3)_3[Al(OCH_3)_3]_3$$

In the preferred practice of the invention, the aluminum methylate in the above equation may be replaced by another aluminum alkylate, a mixture of aluminum alkylates, a mixed molecule aluminum alkylate or mixtures thereof. Suitable liquid carriers are the ethers, such as diethyl ether, tetrahydrofuran, dibutyl ether or the dimethyl or diethyl ethers of the diethylene glycols or mixtures of the ethers with hydrocarbon solvents, such as hexane, cyclohexane or benzene.

As illustrative of aluminum alcoholates which may be used in the practice of the invention, I may mention aluminum ethylate, isopropylate, hexylate, methylate, n-propylate, dimethyl monoisopropylate, n-butylate, tertiary butylate, secondary butylate, n-amylate, tertiary amylate, methyl isobutyl carbinylate, 3-heptylate, di-isopropyl carbinylate, n-octylate, 2,6,8-trimethyl-4-nonylate, allylate, oleylate, stearylate, 2-methyl-2,4-pentanediol alcoholate, benzylate, p-methyl benzylate, o-methyl benzylate, 2-phenyl cyclohexylate, 1,3-dichloro-2-propylate, cyclohexylate, cyclopentylate and cycloheptylate.

The invention is illustrated further by the following specific examples.

Example 1

A solution of aluminum borohydride etherate of tetrahydrofuran was prepared as follows. 13.5 grams of aluminum chloride, pulverized in a dry box, and 1.9 grams of powdered sodium borohydride were placed in a 60 ml. round bottom flask. A receiver was filled with 15 ml. of dry tetrahydrofuran. The apparatus was flushed out with dry nitrogen and the reactor was warmed up slowly to 130° C. At about 110° C. a reaction commenced. The receiver was cooled with a Dry Ice-acetone bath. The reaction lasted about 80 minutes. An active hydrogen determination on the resulting tetrahydrofuran solution showed that 0.5 ml. of solution liberated 60 ml. of hydrogen. This is equivalent to 1800 ml. of hydrogen for the whole solution or equal to 0.50 gram of aluminum borohydride. The yield was approximately 40 percent of theory.

This solution of 0.50 gram of aluminum borohydride was added to a solution of 5 grams of aluminum isopropylate in 30 ml. of tetrahydrofuran. The reaction mixture warmed up about 10° to 15° C. A clear solution resulted. The tetrahydrofuran was pulled off by vacuum and the residue, which consisted of an oil and a white solid, was distilled under a pressure of about 1 mm. of mercury. 4.1 grams of a colorless, viscous oil was distilled at 120°–125° C. Tests showed that this product had the formula $$AlH_3(BH_3)_3[Al(OR)_3]_3$$

where R is isopropyl.

Example 2

17 grams of a product having the formula $$AlH_3(BH_3)_3[Al(OCH_3)_3]_3$$

was dissolved in 50 ml. of dry benzene and to this solution was added a solution of 16 grams of ethyl benzoate in 50 ml. of dry benzene. The solution was refluxed for 30 minutes. Then, 60 ml. of 5 N hydrochloric acid and 60 ml. of water was added. The benzene layer was washed with an aqueous sodium bicarbonate solution and again with water and then dried with magnesium sulphate. The benzene was distilled off and the remainder fractionated under a pressure of 1 mm. Between 85° and 90° C., benzyl alcohol was obtained with a yield of 77 percent of theoretical.

I claim:

1. The method for preparing complexes of aluminum alcoholates with aluminum and boron hydrides having the formula

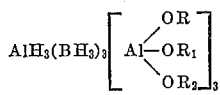

where R, $R_1$ and $R_2$ are monovalent radicals selected from the group consisting of alkyl, cycloalkyl, alkenyl, aralkyl and an alkyl radical substituted with a halogen which comprises reacting an aluminum borohydride etherate with an aluminum alcoholate in an ether-containing liquid carrier in the proportion of one mole of aluminum borohydride etherate to three moles of aluminum alcoholate, the aluminum alcoholate being selected from the group consisting of those having the formulas

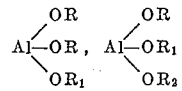

and mixtures thereof.

2. The method as claimed by claim 1 wherein the aluminum alcoholate is a mixed molecule aluminum alkylate.

3. The method as claimed by claim 1 wherein the aluminum alcoholate is a mixture of aluminum alkylates.

4. The method as claimed by claim 1 wherein the aluminum alcoholate is aluminum isopropylate.

5. The method as claimed by claim 1 wherein the liquid carrier is a hydrocarbon solvent containing an amount of an ether sufficient to form an etherate of aluminum borohydride.

References Cited in the file of this patent

UNITED STATES PATENTS 2,494,968    Schlesinger _____ Jan. 17, 1950